(12) United States Patent
Davis

(10) Patent No.: US 10,457,602 B1
(45) Date of Patent: Oct. 29, 2019

(54) ASPHALT FORMULATIONS AND METHODS FOR PRODUCTION

(71) Applicant: Herbert Malarkey Roofing Company, Portland, OR (US)

(72) Inventor: James S. Davis, Portland, OR (US)

(73) Assignee: Herbert Malarkey Roofing Company, Portland, OR (US)

( * ) Notice: Subject to any disclaimer, the term of this patent is extended or adjusted under 35 U.S.C. 154(b) by 20 days.

(21) Appl. No.: 15/947,191

(22) Filed: Apr. 6, 2018

Related U.S. Application Data

(60) Provisional application No. 62/482,732, filed on Apr. 7, 2017.

(51) Int. Cl.

| | |
|---|---|
| *C04B 26/26* | (2006.01) |
| *C04B 18/22* | (2006.01) |
| *C04B 18/20* | (2006.01) |
| *C04B 16/04* | (2006.01) |
| C04B 111/00 | (2006.01) |

(52) U.S. Cl.
CPC .............. *C04B 26/26* (2013.01); *C04B 16/04* (2013.01); *C04B 18/20* (2013.01); *C04B 18/22* (2013.01); *C04B 2111/00586* (2013.01)

(58) Field of Classification Search
CPC ................................ C04B 26/26; C04B 18/22
See application file for complete search history.

(56) References Cited

FOREIGN PATENT DOCUMENTS

| | | | |
|---|---|---|---|
| JP | 2002060583 A | * | 2/2002 |
| KR | 101015134 B1 | * | 2/2011 |

OTHER PUBLICATIONS

Machine translation of JP-2002060583-A. (Year: 2002).*
Machine translation of KR-101015134-B1. (Year: 2011).*

* cited by examiner

*Primary Examiner* — Wenwen Cai
(74) *Attorney, Agent, or Firm* — Hancock Hughey LLP

(57) ABSTRACT

The asphalt formulations according to the invention include the use of post-consumer recycled materials and provide for shingle and roll roofing membranes that exhibit performance requirements of the roofing industry. The formulations provide additional benefits of less blistering compared to conventional polymer modified asphaltic formulations, and are less susceptible to external damage such as scuffing and granule loss. The post-consumer recycled materials are olefinic polymers such as polyethylene and polypropylene waxes that may be derived from, for example, feedstock from waste agricultural films, bottles, milk jugs, waste plastics, consumer bags, polyolefin plastics, and synthesized plastics.

3 Claims, No Drawings

ASPHALT FORMULATIONS AND METHODS FOR PRODUCTION

TECHNICAL FIELD

The present invention relates broadly to roofing products, and more specifically to asphalt compositions and processes for manufacturing the asphaltic compositions, and to products into which the compositions are incorporated.

BACKGROUND

The market for bituminous roofing product has decreased in recent years due in part to the increased use of single ply roll roofing products such as thermoplastic polyolefin (TPO) and polyvinyl chloride (PVC) for low-sloped roofing. Compared to asphalt roll roofing, single ply products are easier to apply and therefore have lower labor costs for installation. These reduced costs have increased the popularity of single ply. Nonetheless, there is a continuous need for asphalt roll roofing and therefore a continuous call for improvements to asphalt formulations that provide for better performance characteristics.

Asphalt shingles continue to be the largest selling steep slope product, but there is a continuous call for improvement in asphalt shingles, incorporating properties that will lead to better weather resistance, whether that is hail, wind or cold. Asphalt shingles are traditionally made with air-oxidized asphalt, usually having a softening point between 195° F. and 225° F., with a penetration between 10 and 25. Use of a polymer modified asphalt imparts properties that resist hail, perform better in high winds events and can function better in all temperatures.

When formulating asphalt compositions for use in roofing products, there is a trade off when selecting the components used in a given blend. For example, some commonly used components enhance elasticity, while other additives can be used to improve rigidity where that characteristic is desired. More specifically, radial and linear styrene butadiene styrene (rSBS and LSBS) are elastomers that are often used in asphalt formulations. Both tend to improve the elasticity of the final product but are fairly expensive. Polyethylene and polypropylene plastomers and other polyolefins are also used in asphalt and they tend to increase rigidity of the final product and pricing may be less expensive. Formulating an asphalt composition can be a difficult endeavor when faced with the competing costs and functional characteristics that may be desired for the finished product.

Another consideration that is important in all aspects of commercial asphalt production is to formulate the blend in a manner that reduces the carbon footprint of the product. This can be a difficult challenge considering that bitumen forms the major component of asphalt formulations, and the finished materials must perform for many years. Using recycled materials in the asphalt formulations requires balancing of properties, compatibility and pricing.

The present invention comprises bituminous compositions and methods of manufacturing them, and bituminous roll roofing and shingle products in which the bituminous compositions are used. The asphalt roll products described herein may be applied in the various manners, including heat or torch application, cold-process, self-adhering or hot mopped.

The asphalt formulations according to the invention provide for membranes that exhibit less blistering compared to conventional formulations, impact resistance and other benefits including less susceptibility to external damage such as from scuffing.

Advantageously, embodiments of the asphaltic formulations of the present invention incorporate olefin polymers comprising polyethylene and/or polypropylene waxes that are derived from recycled content.

SUMMARY OF THE INVENTION

In one aspect, the present invention relates to formulation that utilizes recycled content with virgin polymers to help improve the properties of the asphalt.

In another aspect, the present invention uses recycled materials to provide a partial replacement of asphalt, with or without virgin polymers to improve and strengthen the asphalt.

In still another aspect, the mixing process is defined using time, temperature and mix process, where the recycled polymers mixed with the asphalt form a strong matrix where the recycled materials are dispersed, but not dissolved, giving the properties described herein, yielding desired strength, elasticity and hardness.

In still other aspects, bio-based asphalt consisting in part or whole of recycled materials may be used as a partial replacement of the asphalt and a compatibilizer with the other recycled materials.

In all aspects, properties of formulas yield viscosities allowing the polymer modified materials to be run similar to air-oxidized coatings in normal roofing plant manufacturing equipment.

DETAILED DESCRIPTION OF ILLUSTRATED EMBODIMENTS

The invention will now be described in detail with reference to several formulations and processing methods according to the invention.

Various embodiments and formulations set forth herein call for inclusion of recycled polyethylene and/or recycled polypropylene. Suitable recycled polyethylene and/or recycled polypropylene for use in accordance with the invention are commercially available from a variety of commercial sources. It will further be appreciated by those of skill in the art that in the formulations and embodiments disclosed herein the components incorporated into the formulations is provided by percentages. The percentages that are disclosed should in all instances be considered as ranges and that the functional properties that the components provide to the finished product produced by any embodiment may be substantially reproduced with deviations in the percentages listed below. Without limitation, therefore, the percentages provided herein of components should be considered as including variances in the listed percentages, subject to the desired characteristics of the finished product. Moreover, the percentages and ranges of a component of one formulation may be combined with components from another formulation to generate derivations in formulations.

| Formulation No. 1: | | |
|---|---|---|
| Compound | Embodiment Percentage | Percentage Range |
| ground tire rubber, 10-80 mesh | 3% | Between about 2-8% |

-continued

Formulation No. 1:

| Compound | Embodiment Percentage | Percentage Range |
|---|---|---|
| radial styrene butadiene styrene ("rSBS" herein) | 5% | Between about 3-7% |
| linear styrene butadiene styrene ("LSBS" herein) | 2% | Between about 1-7% |
| Recycled Oxidized/non oxidized polyethylene Recycled Sources: Feedstock from waste agricultural films, bottles, milk jugs, waste plastics, consumer bags, polyolefin plastics, synthesized plastics. | 3.5% | Between about 1-5% |
| Asphalt, 20 to 220 penetration | balance | |

The properties of formulation 1 yield properties that have approximately a ring and ball softening point of 210° F., with a penetration at 77° F. of approximately 19 with a rotational viscosity at 375° F. of 500 cps. Additional properties include dynamic shear rheometry amplitude sweep testing (Ramp logarithmic 6 pts per decade 0.1% to 100% strain level, 10 Rads at 194 F) with the following properties:
Net Yield=G'/G" 3.5%-6%$_\gamma$, 3500-4500 PA using 8 mm plates with a 1 mm gap.

Formulation No. 2:

| Compound | Embodiment Percentage | Percentage Range |
|---|---|---|
| ground tire rubber, 10-80 mesh | 5% | Between about 4-6% |
| radial styrene butadiene styrene ("rSBS") | 2% | Between about 1-6% |
| linear styrene butadiene styrene ("LSBS") | 3% | Between about 2-6% |
| Recycled Oxidized/non oxidized polyethylene Recycled Sources: Feedstock from waste agricultural films, bottles, milk jugs, waste plastics, consumer bags, polyolefin plastics, synthesized plastics. | 2% | Between about 1-5% |
| Asphalt, 20 to 220 penetration | balance | |

The properties of formulation 2 yield properties that have approximately a ring and ball softening point of 233° F., with a penetration at 77° F. of approximately 35 with a rotational viscosity at 375° F. of 1546 cps. Additional properties include dynamic shear rheometry amplitude sweep testing (Ramp logarithmic 6 pts per decade 0.1% to 100% strain level, 10 Rads at 194 F) with the following properties:
Net Yield=G'/G" 2.5%-4%$_\gamma$, 2500-4000 PA using 8 mm plates with a 1 mm gap Formulation No. 3:

| Compound | Embodiment Percentage | Percentage Range |
|---|---|---|
| ground tire rubber, 10-80 mesh | 5% | Between about 4-8% |
| rSBS | 2% | Between about 1-6% |
| LSBS | 3% | Between about 2-6% |

-continued

Formulation No. 3:

| Compound | Embodiment Percentage | Percentage Range |
|---|---|---|
| recycled polyethylene/ polypropylene Recycled Sources: Feedstock from waste agricultural films, bottles, milk jugs, waste plastics, consumer bags, polyolefin plastics, synthesized plastics. | 3% | Between about 2-5% |
| Asphalt, 20 to 220 penetration | balance | |

The properties of formulation 3 yield properties that have approximately a ring and ball softening point of 233° F., with a penetration at 77° F. of approximately 35 with a rotational viscosity at 375° F. of 1546 cps. Additional properties include dynamic shear rheometry amplitude sweep testing (Ramp logarithmic 6 pts per decade 0.1% to 100% strain level, 10 Rads at 194 F) with the following properties:
Net Yield=G'/G" 2.5%-4%$_\gamma$, 2500-4000 PA using 8 mm plates with a 1 mm gap The following formulations are specifically for use with engineered coatings, for example, with roofing shingles:

Formulation No. 4:

| Compound | Embodiment Percentage | Percentage Range |
|---|---|---|
| ground tire rubber, 10 - 80 mesh | 10% | Between about 8-12% |
| rSBS | 1% | Between about 0.5-1.5% |
| LSBS | 2% | Between about 1-3% |
| recycled polyethylene/ polypropylene Recycled Sources: Feedstock from waste agricultural films, bottles, milk jugs, waste plastics, consumer bags, polyolefin plastics, synthesized plastics. | 3% | Between about 1-5% |
| Asphalt, 20 to 220 penetration | balance | |

The properties of formulation 4 yield properties that have approximately a ring and ball softening point of 204° F., with a penetration at 77° F. of approximately 38 with a rotational viscosity at 375° F. of 606 cps. Additional properties include dynamic shear rheometry amplitude sweep testing (Ramp logarithmic 6 pts per decade 0.1% to 100% strain level, 10 Rads at 140° F.) with the following properties:
Net Yield=G'/G" 13-14%$_\gamma$, 115,000-118,000 PA using 8 mm plates with a 1 mm gap Formulation No. 5:

| Compound | Embodiment Percentage | Range Percentage |
|---|---|---|
| ground tire rubber, 10-80 mesh | 10% | Between about 8-12% |
| rSBS | 1% | Between about 0.5-5% |
| LSBS | 3% | Between about 1-5% |

Formulation No. 5:

| Compound | Embodiment Percentage | Range Percentage |
|---|---|---|
| recycled polyethylene/polypropylene<br>Recycled Sources: Feedstock from waste agricultural films, bottles, milk jugs, waste plastics, consumer bags, polyolefin plastics, synthesized plastics. | 3.5% | Between about 2-5% |
| Asphalt, 20 to 220 penetration | balance | |

The properties of formulation 5 yield properties that have approximately a ring and ball softening point of 214° F., with a penetration at 77° F. of approximately 33 with a rotational viscosity at 375° F. of 1045 cps. Additional properties include dynamic shear rheometer amplitude sweep testing (Ramp logarithmic 6 pts per decade 0.1% to 100% strain level, 10 Rads at 140° F.) with the following properties:
Net Yield=G'/G" 2.5%-4%$_y$, 118,000-124,000 PA using 8 mm plates with a 1 mm gap.

Formulation No. 6:

| Compound | Embodiment Percentage | Range Percentage |
|---|---|---|
| ground tire rubber, 10-80 mesh | 10% | Between about 8-12% |
| rSBS | 1% | Between about 0.5-5% |
| LSBS | 3% | Between about 1-5% |
| recycled polyethylene/polypropylene<br>Recycled Sources: Feedstock from waste agricultural films, bottles, milk jugs, waste plastics, consumer bags, polyolefin plastics, synthesized plastics. | 3% | Between about 2-5% |
| Asphalt, 20 to 220 penetration | balance | |

The properties of formulation 6 yield properties that have approximately a ring and ball softening point of 218° F., with a penetration at 77° F. of approximately 35 with a rotational viscosity at 375° F. of 115 cps. Additional properties include dynamic shear rheometry amplitude sweep testing (Ramp logarithmic 6 pts per decade 0.1% to 100% strain level, 10 Rads at 140° F.) with the following properties:
Net Yield=G'/G" 13-14%$_y$, 115,000-118,000 PA using 8 mm plates with a 1 mm gap.

Formulation No. 7:

| Compound | Embodiment Percentage | Range Percentage |
|---|---|---|
| ground tire rubber, 10-80 mesh | 10% | Between about 8-12% |
| rSBS | 1% | Between about 0.5-5% |
| LSBS | 3% | Between about 2-5% |
| Recycled polyethylene<br>Recycled Sources: Feedstock from waste agricultural films, bottles, milk jugs, waste plastics, consumer bags, polyolefin plastics, synthesized plastics. | 2% | Between about 1-5% |
| Asphalt, 20 to 220 penetration | balance | |

The properties of formulation 7 yield properties that have approximately a ring and ball softening point of 229° F., with a penetration at 77° F. of approximately 30 with a rotational viscosity at 375° F. of 1726 cps. Additional properties include dynamic shear rheometry amplitude sweep testing (Ramp logarithmic 6 pts per decade 0.1% to 100% strain level, 10 Rads at 140° F.) with the following properties:
Net Yield=G'/G" 9-11%$_y$, 105,000-118,000 PA using 8 mm plates with a 1 mm gap.

Formulation No. 8:

| Compound | Embodiment Percentage | Percentage Range |
|---|---|---|
| ground tire rubber, 10-80 mesh | 6% | Between about 4-8% |
| rSBS | 4% | Between about 3-7% |
| maleated propylene or recycled polyethylene/polypropylene<br>Recycled Sources: Feedstock from waste agricultural films, bottles, milk jugs, waste plastics, consumer bags, polyolefin plastics, synthesized plastics. | 2% | Between about 1-7% |
| Asphalt, 20 to 220 penetration | balance | |

The properties of formulation 8 yield properties that have approximately a ring and ball softening point of 204° F., with a penetration at 77° F. of approximately 22 with a rotational viscosity at 375° F. of 474 cps. Additional properties include dynamic shear rheometry amplitude sweep testing (Ramp logarithmic 6 pts per decade 0.1% to 100% strain level, 10 Rads at 140° F.) with the following properties:
Net Yield=G"/G' using 8 mm plates with a 1 mm gap.

Formulation No. 9:

| Compound | Embodiment Percentage | Percentage Range |
|---|---|---|
| ground tire rubber, 10-80 mesh | 6% | Between about 4-8% |
| rSBS | 4% | Between about 3-7% |
| recycled polyethylene/polypropylene<br>Recycled Sources: Feedstock from waste agricultural films, bottles, milk jugs, waste plastics, consumer bags, polyolefin plastics, synthesized plastics. | 2.5% | Between about 2-7% |
| Asphalt, 20 to 220 penetration | balance | |

The properties of formulation 9 yield properties that have approximately a ring and ball softening point of 203° F., with a penetration at 77° F. of approximately 25 with a rotational viscosity at 375° F. of 324 cps. Additional properties include dynamic shear rheometer amplitude sweep testing (Ramp logarithmic 6 pts per decade 0.1% to 100% strain level, 10 Rads at 140° F.) with the following properties:

Net Yield=G"/G' using 8 mm plates with a 1 mm gap.

| Formulation No. 10: | | |
| --- | --- | --- |
| Compound | Embodiment Percentage | Percentage Range |
| ground tire rubber, 10-80 mesh | 6% | Between about 4-8% |
| rSBS | 3% | Between about 2-4% |
| LSBS | 1% | Between about 0.5-2.5% |
| recycled polyethylene/ polypropylene Recycled Sources: Feedstock from waste agricultural films, bottles, milk jugs, waste plastics, consumer bags, polyolefin plastics, synthesized plastics. | 2.5% | Between about 1-4% |
| Asphalt, 20 to 220 penetration | balance | |

The properties of formulation 10 yield properties that have approximately a ring and ball softening point of 204° F., with a penetration at 77° F. of approximately 26 with a rotational viscosity at 375° F. of 596 cps. Additional properties include dynamic shear rheometer amplitude sweep testing (Ramp logarithmic 6 pts per decade 0.1% to 100% strain level, 10 Rads at 140° F.) with the following properties:

Net Yield=G"/G' using 8 mm plates with a 1 mm gap.

| Formulation No. 11: | | |
| --- | --- | --- |
| Compound | Embodiment Percentage | Percentage Range |
| rSBS | 3% | Between about 1-6% |
| LSBS | 2% | Between about 1-6% |
| recycled polyethylene/ polypropylene Recycled Sources: Feedstock from waste agricultural films, bottles, milk jugs, waste plastics, consumer bags, polyolefin plastics, synthesized plastics. | 3% | Between about 2-5% |
| Asphalt, 20 to 220 penetration | balance | |

The properties of formulation 11 yield properties that have approximately a ring and ball softening point of 190° F., with a penetration at 77° F. of approximately 25 with a rotational viscosity at 375° F. of 324 cps. Additional properties include dynamic shear rheometer amplitude sweep testing (Ramp logarithmic 6 pts per decade 0.1% to 100% strain level, 10 Rads at 140° F.) with the following properties:

Net Yield=G"/G' using 8 mm plates with a 1 mm gap.

| Formulation No. 12: | | |
| --- | --- | --- |
| Compound | Embodiment Percentage | Percentage Range |
| ground tire rubber, 10-80 mesh | 10% | Between about 8-12% |
| styrene ethylene butadiene styrene ("SEBS") | 5% | Between about 3-7% |
| Maleated propylene/polyethylene or recycled polyethylene/polypropylene Recycled Sources: Feedstock from waste agricultural films, bottles, milk jugs, waste plastics, consumer bags, polyolefin plastics, synthesized plastics. | 4% | Between about 2-6% |
| Asphalt, 20 to 220 penetration | balance | |

The properties of formulation 12 yield properties that have approximately a ring and ball softening point of 273° F., with a penetration at 77° F. of approximately 23 with a rotational viscosity at 375° F. of 1343 cps. Additional properties include dynamic shear rheometer amplitude sweep testing (Ramp logarithmic 6 pts per decade 0.1% to 100% strain level, 10 Rads at 194° F.) with the following properties:

Net Yield=G'/G". 2.5%-4%$_y$, 2000-5000 PA. 8 mm plates, 1 mm gap.

Properties:

SP: 273 Pen 77;

23 Visc 375-1343

Amplitude Sweep, Ramp logarithmic 6 pts per decade 0.1% to 100% strain level, 10 Rads at 194 F.

Net Yield=G'/G". 2.5%-4%$_y$, 2000-5000 PA. 8 mm plates, 1 mm gap.

| Formulation No. 13: | | |
| --- | --- | --- |
| Compound | Embodiment Percentage | Percentage Range |
| bio-asphalt | 10% | Between about 8-12% |
| rSBS | 5% | Between about 1-7% |
| LSBS | 2% | Between about 1-7% |
| Maleated propylene/polyethylene or recycled polyethylene/polypropylene Recycled Sources: Feedstock from waste agricultural films, bottles, milk jugs, waste plastics, consumer bags, polyolefin plastics, synthesized plastics. | 3% | Between about 2-5% |
| Asphalt, 20 to 220 penetration | balance | |

The properties of formulation 13 yield properties that have approximately a ring and ball softening point of 250° F., with a penetration at 77° F. of approximately 47 with a rotational viscosity at 375° F. of 540 cps. Additional properties include dynamic shear rheometer amplitude sweep testing (Ramp logarithmic 6 pts per decade 0.1% to 100% strain level, 10 Rads at 194° F.) with the following properties:

Net Yield=G'/G". 10%-12%$_y$, 6000-8000 PA. 8 mm plates, 1 mm gap.

| Formulation No. 14: | | |
|---|---|---|
| Compound | Embodiment Percentage | Percentage Range |
| bio-asphalt | 15% | Between about 12-18% |
| thermal fluid/recycled oil | 1% | Between about 0.5-2% |
| rSBS | 5% | Between about 1-6% |
| LSBS | 2% | Between about 1-6% |
| Maleated propylene/polyethylene or recycled polyethylene/polypropylene Recycled Sources: Feedstock from waste agricultural films, bottles, milk jugs, waste plastics, consumer bags, polyolefin plastics, synthesized plastics. | 3% | Between about 2-5% |
| Asphalt, 20 to 220 penetration | balance | |

The properties of formulation 14 yield properties that have approximately a ring and ball softening point of 254° F., with a penetration at 77° F. of approximately 54 with a rotational viscosity at 375° F. of 582 cps. Additional properties include dynamic shear rheometer amplitude sweep testing (Ramp logarithmic 6 pts per decade 0.1% to 100% strain level, 10 Rads at 194° F.) with the following properties:
Net Yield=G'/G". 30%-36%$_\gamma$, 3000-5000 PA. 8 mm plates, 1 mm gap.

| Formulation No. 15: | | |
|---|---|---|
| Compound | Embodiment Percentage | Percentage Range |
| bio-asphalt | 15% | Between about 12-18% |
| ground tire rubber, 10-80 mesh | 17% | Between about 15-20% |
| LSBS | 3% | Between about 2-5% |
| Maleated propylene/polyethylene or recycled polyethylene/polypropylene Recycled Sources: Feedstock from waste agricultural films, bottles, milk jugs, waste plastics, consumer bags, polyolefin plastics, synthesized plastics. | 3% | Between about 2-5% |
| Asphalt, 20 to 220 penetration | balance | |

The properties of formulation 15 yield properties that have approximately a ring and ball softening point of 262° F., with a penetration at 77° F. of approximately 47 with a rotational viscosity at 375° F. of 843 cps. Additional properties include dynamic shear rheometer amplitude sweep testing (Ramp logarithmic 6 pts per decade 0.1% to 100% strain level, 10 Rads at 194° F.) with the following properties:
Net Yield=G'/G". 4%-6%$_\gamma$, 70,000-75,000 PA. 8 mm plates, 1 mm gap.

| Formulation No. 16: | | |
|---|---|---|
| Compound | Embodiment Percentage | Percentage Range |
| ground tire rubber, 10 - 80 mesh | 5% | Between about 4-6% |
| rSBS | 3% | Between about 1-6% |
| LSBS | 3% | Between about 1-6% |
| recycled polyethylene/polypropylene | 2% | Between about 1-5% |

-continued

| Formulation No. 16: | | |
|---|---|---|
| Compound | Embodiment Percentage | Percentage Range |
| Recycled Sources: Feedstock from waste agricultural films, bottles, milk jugs, waste plastics, consumer bags, polyolefin plastics, synthesized plastics. | | |
| Asphalt, 20 to 220 penetration | balance | |

The properties of formulation 16 yield properties that have approximately a ring and ball softening point of 220° F., with a penetration at 77° F. of approximately 35 with a rotational viscosity at 375° F. of 800 cps. Additional properties include dynamic shear rheometer amplitude sweep testing (Ramp logarithmic 6 pts per decade 0.1% to 100% strain level, 10 Rads at 194° F.) with the following properties:
Net Yield=G'/G". 4%-12%$_\gamma$, 3000-7000 PA. 8 mm plates, 1 mm gap.

Processing Methods for Formulation Nos. 1 Through 16

Each of the formulations above in nos. 1 through 16 was processed in a batch according to the following methodology. Preferred equipment is a rotor-stator high shear mill (mixer), such as a Siefer or Supratron mill, for the initial mix, although other types of high shear mixers, including in-line mixers will yield similar results but with potentially longer mix times. Mix time will be dependent upon the temperature, as well as the gap on the mill, or the amount of shear generated. Slow speed agitation with high temperatures do not produce the desired batch properties.

A. Asphalt was added to mixing tank at 385-425 F;
B. Crumb rubber was added to the asphalt according to batch size and high shear mixing was begun;
C. Batch was held at a temperature of 375 to 420° F. while high shear was continued for 5 to 50 minutes, visually checking for fluidness properties;
D. if visual check acceptable, the remaining batch ingredients specific to a formulation were added and processed for an additional 20 minutes at temperatures between 350 to 415° F.;
E. After mixing, the batch was moved to a slow speed agitated holding tank and held at about 320 to 400° F. prior to use.
F Processing for formulation no. 15 is the same except flux weight is offset by crumb percentage.
G. Batches will be tested for properties such as softening point, penetration, viscosity and/or Dynamic Shear Rheometry.

The following formulations are specifically for use with engineered coatings, for example, with roll materials:

| Formulation No. 17: | | |
|---|---|---|
| Compound | Embodiment Percentage | Percentage Range |
| ground tire rubber, 10-80 mesh | 10% | Between about 8-12% |
| rSBS | 3% | Between about 1-6% |
| LSBS | 3% | Between about 1-6% |
| Asphalt, 20 to 220 penetration | balance | |

The properties of formulation 17 yield properties that have approximately a ring and ball softening point of 232° F., with a penetration at 77° F. of approximately 50 with a rotational viscosity at 375° F. of 2812 cps. Additional properties include dynamic shear rheometer amplitude sweep testing (Ramp logarithmic 6 pts per decade 0.1% to 100% strain level, 10 Rads at 140° F.) with the following properties:
Net Yield=G"/G'. 8 mm plates, 1 mm gap.

| Formulation No. 18: | | |
|---|---|---|
| Compound | Embodiment Percentage | Percentage Range |
| ground tire rubber, 10-80 mesh | 10% | Between about 8-12% |
| rSBS | 4% | Between about 1-8% |
| LSBS | 4% | Between about 1-8% |
| Asphalt, 20 to 220 penetration | balance | |

The properties of formulation 18 yield properties that have approximately a ring and ball softening point of 250° F., with a penetration at 77° F. of approximately 45 with a rotational viscosity at 375° F. of 4483 cps. Additional properties include dynamic shear rheometer amplitude sweep testing (Ramp logarithmic 6 pts per decade 0.1% to 100% strain level, 10 Rads at 194° F.) with the following properties:
Net Yield=G'/G". 24%-26%$_\gamma$, 24,000-27,000 PA. 8 mm plates, 1 mm gap.

| Formulation No. 19: | | |
|---|---|---|
| Compound | Embodiment Percentage | Percentage Range |
| ground tire rubber, 10-80 mesh | 15% | Between about 12-18% |
| rSBS | 3% | Between about 2-5% |
| maleated propylene/polyethylene or recycled polyethylene/polypropylene Recycled Sources: Feedstock from waste agricultural films, bottles, milk jugs, waste plastics, consumer bags, polyolefin plastics, synthesized plastics. | 2% | Between about 1-5% |
| Asphalt, 20 to 220 penetration | balance | |

The properties of formulation 19 yield properties that have approximately a ring and ball softening point of 195° F., with a penetration at 77° F. of approximately 71 with a rotational viscosity at 375° F. of 861 cps. Additional properties include dynamic shear rheometer amplitude sweep testing (Ramp logarithmic 6 pts per decade 0.1% to 100% strain level, 10 Rads at 140° F.) with the following properties:
Net Yield=G"/G'. 8 mm plates, 1 mm gap.

| Formulation No. 20: | | |
|---|---|---|
| Compound | Embodiment Percentage | Percentage Range |
| ground tire rubber, 10-80 mesh | 15% | Between about 12-18% |
| rSBS | 1% | Between about 0.5-14% |
| LSBS | 2% | Between about 1-4% |
| Asphalt, 20 to 220 penetration | balance | |

The properties of formulation 20 yield properties that have approximately a ring and ball softening point of 203° F., with a penetration at 77° F. of approximately 35 with a rotational viscosity at 375° F. of 2956 cps. Additional properties include dynamic shear rheometer amplitude sweep testing (Ramp logarithmic 6 pts per decade 0.1% to 100% strain level, 10 Rads at 140° F.) with the following properties:
Net Yield=G"/G'. 8 mm plates, 1 mm gap.

| Formulation No. 21: | | |
|---|---|---|
| Compound | Embodiment Percentage | Percentage Range |
| ground tire rubber, 10-80 mesh | 15% | Between about 13-17% |
| bio-asphalt | 10% | Between about 8-12% |
| Recycled oil | 2% | Between about 1-3% |
| LSBS | 3% | Between about 1-6% |
| maleated propylene/polyethylene or recycled polyethylene/polypropylene Recycled Sources: Feedstock from waste agricultural films, bottles, milk jugs, waste plastics, consumer bags, polyolefin plastics, synthesized plastics. | 4% | Between about 2-5% |
| Asphalt, 20 to 220 penetration | balance | |

The properties of formulation 21 yield properties that have approximately a ring and ball softening point of 246° F., with a penetration at 77° F. of approximately 30 with a rotational viscosity at 375° F. of 1310 cps. Additional properties include dynamic shear rheometer amplitude sweep testing (Ramp logarithmic 6 pts per decade 0.1% to 100% strain level, 10 Rads at 140° F.) with the following properties:
Net Yield=G"/G'. 8 mm plates, 1 mm gap.

| Formulation No. 22: | | |
|---|---|---|
| Compound | Embodiment Percentage | Percentage Range |
| ground tire rubber, 10-80 mesh | 17% | Between about 15-20% |
| Bio-asphalt | 20% | Between about 18-22% |
| LSBS | 3% | Between about 2-4% |
| maleated propylene/polyethylene or recycled polyethylene/polypropylene Recycled Sources: Feedstock from waste agricultural films, bottles, milk jugs, waste plastics, consumer bags, polyolefin plastics, synthesized plastics. | 4% | Between about 3-5% |
| Asphalt, 20 to 220 penetration | balance | |

The properties of formulation 22 yield properties that have approximately a ring and ball softening point of 243° F., with a penetration at 77° F. of approximately 45 with a rotational viscosity at 375° F. of 2256 cps. Additional properties include dynamic shear rheometer amplitude sweep testing (Ramp logarithmic 6 pts per decade 0.1% to 100% strain level, 10 Rads at 140° F.) with the following properties:
Net Yield=G'/G". 24%-26%$_\gamma$, 33,000-37,000 PA. 8 mm plates, 1 mm gap.

Processing Methods for Formulation Nos. 17 Through 22

Each of the formulations above in formulations nos. 17 through 22 was processed in a batch according to the following methodology. Preferred equipment is a rotor-stator high shear mill (mixer), such as a Siefer or Supratron mill, for the initial mix, although other types of high shear mixers, including in-line mixers will yield similar results but with potentially longer mix times. Mix time will be dependent upon the temperature, as well as the gap on the mill, or the amount of shear generated. Slow speed agitation with high temperatures do not produce the desired batch properties.

A. Asphalt is brought in at a temperature between 375-415° F.;

B. the crumb rubber is added according to batch size and high shear mixing was begun;

C. begin processing when the temperature is between 385 to 405° F.;

process for approximately 15 to 50 minutes, visually checking for fluidness properties;

D. if visual check acceptable, add remaining batch ingredients specific to the desired formulation and process for an additional 20 minutes at 350 to 415° F.;

E. after processing, move batch to slow speed agitated holding tank and hold at about 320 to 400° F. preparatory to use.

F Batches will be tested for properties such as softening point, penetration, viscosity and/or Dynamic Shear Rheometry.

| Formulation No. 23: | | |
|---|---|---|
| Compound | Embodiment Percentage | Percentage Range |
| ground tire rubber, 10-80 mesh | 10% | Between about 8-12% |
| rSBS | 1% | Between about 0.5-3% |
| LSBS | 2% | Between about 1-3% |
| recycled polyethylene/polypropylene Recycled Sources: Feedstock from waste agricultural films, bottles, milk jugs, waste plastics, consumer bags, polyolefin plastics, synthesized plastics. | 3% | Between about 2-4% |
| Asphalt, 20 to 220 penetration | balance | |

The properties of formulation 23 yield properties that have approximately a ring and ball softening point of 204° F., with a penetration at 77° F. of approximately 38 with a rotational viscosity at 375° F. of 1022 cps. Additional properties include dynamic shear rheometer amplitude sweep testing (Ramp logarithmic 6 pts per decade 0.1% to 100% strain level, 10 Rads at 140° F.) with the following properties:
Net Yield=G"/G' using 8 mm plates with 1 mm gap.

Processing Method for Formulation No. 23

The formulation of formulation no. 23 was processed in a batch according to the following methodology. Preferred equipment is a rotor-stator high shear mill (mixer), such as a Siefer or Supratron mill, for the initial mix, although other types of high shear mixers, including in-line mixers will yield similar results but with potentially longer mix times. Mix time will be dependent upon the temperature, as well as the gap on the mill, or the amount of shear generated. Slow speed agitation with high temperatures do not produce the desired batch properties.

A. The asphalt was brought into a mixing tank at temperatures between 350 and 400° F.;

B. all ingredients added and high shear mixing was begun as soon as addition began;

C. processing time began when the temperature reached 370° F. and continue to process for 45 minutes when temperatures were between 370 to 415° F.;

D. after processing, the batch was pumped into agitated holding tank preparatory to use.

E. Batches were tested for finished properties such as softening point, penetration, rotational viscosity and/or Dynamic Shear Rheometry.

| Formulation No. 24: High Temperature | | |
|---|---|---|
| Compound | Embodiment Percentage | Percentage Range |
| ground tire rubber, 10-80 mesh | 10% | Between about 8-12% |
| rSBS | 3% | Between about 1-6% |
| LSBS | 3% | Between about 1-6% |
| Tack oil Naphthenic Oils/Paraffinic Oils/Refined Oils | 4% | Between about 2-5% |
| asphalt, 20-220 pen | balance | |

The properties of formulation 24 yield properties that have approximately a ring and ball softening point of 229° F., with a penetration at 77° F. of approximately 61 with a rotational viscosity at 350° F. of 4085 cps. Additional properties include dynamic shear rheometer amplitude sweep testing (Ramp logarithmic 6 pts per decade 0.1% to 100% strain level, 10 Rads at 140° F.) with the following properties:

Net Yield=G"/G' using 8 mm plates with 1 mm gap.

| Formulation No. 25: Top Formula | | |
|---|---|---|
| Compound | Embodiment Percentage | Percentage Range |
| ground tire rubber, 10-80 mesh | 15% | Between about 13-18% |
| rSBS | 1% | Between about 0.5-1.5% |
| LSBS | 2% | Between about 1-3% |
| recycled polyethylene/polypropylene Recycled Sources: Feedstock from waste agricultural films, bottles, milk jugs, waste plastics, consumer bags, polyolefin plastics, synthesized plastics. | 3% | Between about 2-4% |
| Asphalt, 20 to 220 penetration | balance | |

The properties of formulation 25 yield properties that have approximately a ring and ball softening point of 219° F., with a penetration at 77° F. of approximately 33 with a rotational viscosity at 375° F. of 1447 cps. Additional properties include dynamic shear rheometer amplitude sweep testing (Ramp logarithmic 6 pts per decade 0.1% to 100% strain level, 10 Rads at 140° F.) with the following properties:

Net Yield=G"/G' using 8 mm plates with 1 mm gap.

Formula 26 Bottom Coat

| Compound | Embodiment Percentage | Percentage Range |
|---|---|---|
| ground tire rubber, 10-80 mesh | 10% | Between about 8-12% |
| rSBS | 1% | Between about 0.5-5% |
| LSBS | 4% | Between about 1-5% |
| tack oil | 4% | Between about 2-5% |
| Naphthenic Oils/Paraffinic Oils/Refined Oils | | |
| asphalt, 20-220 pen | balance | |

The properties of formulation 26 yield properties that have approximately a ring and ball softening point of 211° F., with a penetration at 77° F. of approximately 78 with a rotational viscosity at 350° F. of 1450 cps. Additional properties include dynamic shear rheometer amplitude sweep testing (Ramp logarithmic 6 pts per decade 0.1% to 100% strain level, 10 Rads at 140° F.) with the following properties: Net Yield=G"/G' using 8 mm plates with 1 mm gap.

Processing Method for Formulation No. 24-26

The formulation above in no. 24-26 was processed in a batch according to the following methodology. Again, the preferred equipment is a rotor-stator high shear mill (mixer), such as a Siefer or Supratron mill, for the initial mix, although other types of high shear mixers, including in-line mixers will yield similar results but with potentially longer mix times. Mix time will be dependent upon the temperature, as well as the gap on the mill, or the amount of shear generated. Slow speed agitation with high temperatures do not produce the desired batch properties.

No. 25 (Top Formula)

A. The asphalt was brought into a mixing tank at 375-415° F.;
B. the batch weight was offset with 15% ground tire rubber;
C. processing was begun at a temperature of 380° F. with high shear mixing for 20-40 minutes;
D. the remaining ingredients were added and high shear mixing was continued;
E. Processing time after all materials were added was approximately 20-30 minutes;
F. after processing, the finished batch was pumped into an agitated holding tank set at 275-350° F. prior to use.
G. Batch properties could be tested using softening point, penetration, rotational viscosity and/or Dynamic Shear Rheometry.

Mix Procedure for Formula 24s and 26

A. The asphalt was brought into a mixing tank at 375-415° F.;
B. the batch weight was offset with 15% ground tire rubber;
C. processing was begun at 375-395° F. with high shear mixing for 20-40 minutes;
D. remaining ingredients added and high shear mixing was continued;
E. continue to process for approximately 20-30 minutes;
F. after processing, pump into agitated holding tank set at 250-310° F. prior to use There are numerous benefits to the asphaltic formulations according to the present invention that utilize recycled polyethylene and/or polypropylene waxes in combination with the other components set forth herein. For example, it has been found that compared to conventional asphaltic formulations, the formulations provide increased hardness, which provides greater resistance to blister and greater scuff resistance. In addition, the formulations use less styrene butadiene styrene compounds compared to conventional asphalts and have a relatively reduced carbon footprint. The formulations also have relatively lower cost.

While the present invention has been described in terms of preferred and illustrated embodiments, it will be appreciated by those of ordinary skill that the spirit and scope of the invention is not limited to those embodiments, but extend to the various modifications and equivalents as defined in the appended claims

The invention claimed is:

1. An asphalt composition comprising:
   a. ground tire rubber having a mesh size between 10 and 80 mesh in an amount being about 2% to 7% of the composition;
   b. radial styrene butadiene styrene in an amount being between about 1% to 7% of the composition;
   c. linear styrene butadiene styrene in an amount being between about 1% to 7% of the composition;
   d. polyethylene wax or polypropylene wax derived from post-consumer recycled waste in an amount being between about 1% and 5% of the composition;
   e. wherein the balance of the composition is asphalt having between 20 to 220 penetration.

2. An asphalt composition comprising:
   a. ground tire rubber having a mesh size between 10 and 80 mesh in an amount between 8-12% of the composition;
   b. radial styrene butadiene styrene in an amount being between about 1% to 5% of the composition;
   c. linear styrene butadiene styrene in an amount being between about 1% to 5% of the composition;
   d. polyethylene wax or polypropylene wax derived from post-consumer recycled waste in an amount being between about 1% and 5% of the composition;
   e. wherein the balance of the composition is asphalt having between 20 to 220 penetration.

3. An asphalt composition comprising:
   a. ground tire rubber having a mesh size between 10 and 80 mesh in an amount between 4-8% of the composition;
   b. radial styrene butadiene styrene in an amount being between about 1% to 7% of the composition;
   c. polyethylene wax or polypropylene wax derived from post-consumer recycled waste in an amount being between about 1% and 7% of the composition;
   d. wherein the balance of the composition is asphalt having between 20 to 220 penetration.

* * * * *